Feb. 17, 1931.    T. ELLIOTT    1,793,071
BEARING
Filed Dec. 23, 1927
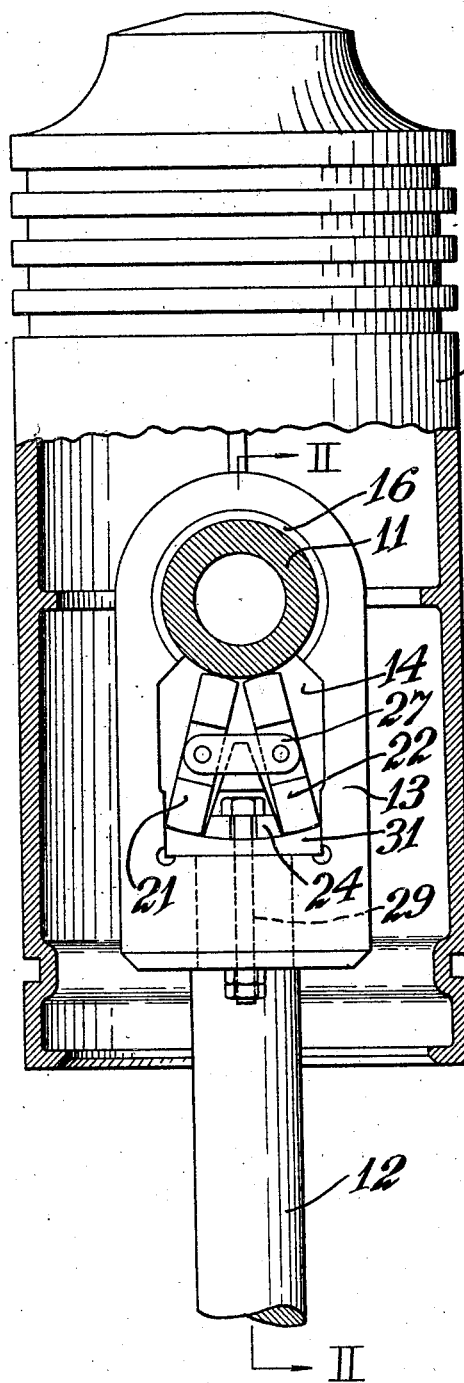
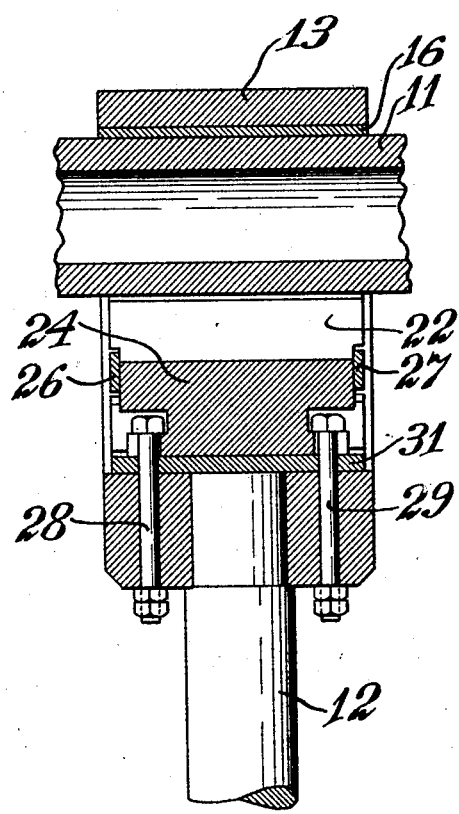
Inventor
*Thomas Elliott*
By
Attorney Patented Feb. 17, 1931

1,793,071

UNITED STATES PATENT OFFICE

THOMAS ELLIOTT, OF BIRMINGHAM, ALABAMA, ASSIGNOR TO CONTINENTAL GIN COMPANY, A CORPORATION OF DELAWARE

BEARING

Application filed December 23, 1927. Serial No. 242,179.

My invention relates to bearings and has for its object the provision of apparatus of the character designated which shall be adapted for use where there is relative oscillatory movement between the bearing and its journal, and which shall be effective to withstand heavy loads with a minimum of friction.

A further object of my invention is to provide an oscillatory bearing adapted for use as a wrist pin bearing in an internal combustion engine which, while designed and adapted to work within the limited space allowed in the piston will yet have sufficient strength to withstand effectively the working forces of the engine with so little friction and wear that it is capable of operating without lubrication.

While my invention, in its broader aspects, has a wide field of application, it is particularly useful as a wrist pin bearing in an internal combustion engine and it is herein so shown and described. The advantages of a roller bearing over a sliding bearing are well understood in the mechanical arts. Heretofore, however, the limitations of space have been such that roller bearings, so far as I am aware, have never been successfully used as wrist pin bearings for an internal combustion engine. This is due to the fact that the safe load on a roller bearing varies with the square of its diameter and the limited space within the confines of an engine piston is such that a roller bearing having rollers of sufficient diameter to withstand the working forces of the engine could not be located in the space available. Furthermore, with rollers of relatively large diameter, the spacing necessitated by their diameters was such that the force exerted by the engine piston could not be transmitted in a straight line through the centers of the rollers to the connecting rod, so that a side thrust on the rollers inevitably resulted at each power stroke of the engine.

Furthermore, as is well understood in the internal combustion engine art, especially with internal combustion engines of the two cycle type, one of the major difficulties of design has been that of providing means for adequately lubricating the piston wrist pin. This is due to the fact that, with engines of this type, there is almost a continuing force exerted on the piston in the same direction, to press the wrist pin against its bearing. The difficulty of lubrication of such a wrist pin has resulted in its becoming heated, due to friction, transmitting its heat to the piston and causing expansion of the piston due to the heat, which has made it necessary to design the piston with sufficient initial clearance with respect to the cylinder walls to permit its expansion due to the heating of the wrist pin, without binding or unnecessary wear.

These and other difficulties are overcome by my invention and I have provided an oscillatory bearing embodying all of the known benefits of a roller bearing and which may be employed as a piston wrist pin bearing and run without lubrication. A heavy duty two cycle Diesel engine in which my improved bearing has been embodied as a wrist pin bearing, has been run continuously at 25% overload for long intervals of time without lubrication, and without showing any measurable wear in the bearing. Furthermore, the absence of heating of the wrist pin has enabled me to design the piston with a closer clearance in the cylinder, thus greatly aiding in overcoming leakage past the piston and eliminating any tendency of friction in the bearing to cause the piston to cock.

Briefly, my invention comprises a pair of oscillatory members, which preferably are similar sections of roller bearings having symmetrical bearing surfaces, disposed longitudinally of the journal in load transmitting relation thereto, and having their axes of rotation pivotally connected. The members are spaced at their outer edges, or bases, so as to incline their pin engaging surfaces radially toward the center of the journal and hold them always on opposite sides of the directional line of force whereby the load is always transmitted through their rotational centers in approximately a straight line to the work being performed. An arcuate bearing seat is provided on which the outer edges or bases of the bearing members rock back and forth as they follow the oscillatory play of the bearing. In its application to an internal combustion engine, a recess is provided in the connecting rod head to house the bearing members and their bearing seat and spacer means.

One embodiment of my invention is illustrated in the accompanying drawing, forming a part of this application, wherein Fig. 1 is a view, partly in section and partly in elevation, showing an internal combustion engine piston having a wrist pin provided with my improved bearing; and Fig. 2 is a sectional view taken along the line II—II of Fig. 1.

Referring now to the drawing for a better understanding of my invention, I show a hollow piston 10 provided with the usual wrist pin 11. The working forces of the engine are transmitted from the piston 10 downwardly to a connecting rod 12 which is provided with a head 13 having a recess 14 which, at its upper end, has a suitable bushing 16 which partially surrounds the wrist pin 11. The head 13 may be secured in any suitable manner to the connecting rod 12. The direction of thrust, or line of thrust of the piston 10, is downwardly as seen in the drawing, the connecting rod 12 having a limited oscillatory movement with respect to the wrist pin 11, as is well understood in the art.

Disposed within the recess 14 is an oscillatory roller bearing, preferably in the form of a pair of oscillatory flattened roller bearing members 21 and 22 which extend longitudinally of the wrist pin and are inclined radially thereto. The bearing members 21 and 22, in their preferred form, comprise similar sections of rollers having concentric bearing surfaces and by making them of relatively narrow transverse width, as shown, I gain the advantage of the load sustaining characteristics of large diameter bearing rollers while at the same time retaining the advantage of close spacing of relatively small diameter bearing rollers. The only limitation to the narrow design of a bearing member is that its arcuate bearing edges should be more than sufficiently wide to roll on the parts they engage in following the angular play of the bearing throughout a complete revolution of the engine.

In order to insure that the load transmitted through the bearing members to the connecting rod shall, at all times, be in as direct a line as possible from the center of the wrist pin through the axes of rotation of the bearing members to the connecting rod, and in order to insure an equal division of load between the bearing members 21 and 22 and keep them on opposite sides of the directional line of force, I provide, as the preferred spacer means, a block 24 between the outer sides of the bearing members 21 and 22 and pivotally connect the rotational axes of the bearing members, at both ends, by links 26 and 27. The spacer block 24 is held in position in the head 13 by means of bolts 28 and 29. As a preferred design, I provide a bearing seat 31 of hardened material as the outer boundary wall of the recess 13. The seat 31 is arcuate in form, concentric to the wrist pin 11, corresponding to the race of a roller bearing, and is held in position by the bolts 28 and 29.

From the foregoing description, the operation of my invention will be apparent. As the piston transmits the working force of the engine to the connecting rod 12, the latter oscillates about the wrist pin 11 as a center. The working force is transmitted from the wrist pin through the bearing members 21 and 22 to the connecting rod 12, and, as the latter oscillates, the members 21 and 22, as they rock back and forth, oscillate about their centers of rotation. The spacer block 24 insures that the working force is transmitted in approximately a direct line through the axes of the bearing members to the connecting rod 12 without any wedging action, and further insures that the directional line of force will fall between, and the force will be transmitted equally through the two bearing members.

From the foregoing it will be apparent that I have devised an improved oscillatory roller bearing occupying a minimum of space, capable of transmitting relatively heavy loads, and embodying the well known advantages of a roller bearing of relatively large diameter.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an oscillatory bearing, opposed concentric roller bearing seats and a flattened roller interposed between, and having peripheral roller bearing surfaces engaging said seats, and means for maintaining the roller bearing surfaces in contact with the seats while oscillating.

2. An oscillatory bearing for a cylindrical member comprising a plurality of similar sections of rollers each having opposed concentric bearing surfaces, each having one of its curved surfaces bearing against the cylindrical member, the several members having their axes of rotation pivotally connected, and means for maintaining the curved surfaces in contact relation with the cylindrical bearing member.

3. An oscillatory bearing for a cylindrical member comprising a pair of similar flattened roller sections having opposed concentric bearing surfaces and disposed radially with respect to said member and on opposite sides of the direction line of the thrust transmitted to the bearing, and means for maintaining said sections with the concentric bearing surfaces in contact with the cylindrical member.

4. An oscillatory bearing for a cylindrical member comprising a pair of flattened roller sections, having curved symmetrical bearing surfaces and disposed radially with respect to said member and on opposite sides of the direction line of the thrust transmitted to the bearing, and means for retaining said members for oscillatory movement with their curved surfaces bearing against the cylindrical member.

5. In a piston wrist pin bearing, a bearing housing surrounding the pin and provided with an elongated recess extending in the direction of thrust transmitted, the end walls of said recess being concentric with the wrist pin, and a plurality of elongated flat members mounted to oscillate within the recess and bearing against the wrist pin and the opposed side of the recess, said members having their bearing surfaces curved, and means for maintaining the curved bearing surfaces in bearing relation with the wrist pin and the opposed side of the recess.

6. In a piston wrist pin bearing, a bearing housing surrounding the pin and provided with an elongated recess extending in the direction of thrust transmitted by the piston, said recess having arcuate end walls, a pair of elongated similar flattened roller sections having symmetrical bearing surfaces disposed within the recess on opposite sides of the direction line of thrust transmitted by the piston and having their curved surfaces bearing against the wrist pin and the opposed side of the recess, and means for maintaining said roller sections in cooperative bearing relation with the wrist pin and the opposed side of the recess.

7. In a piston wrist pin bearing, a bearing housing surrounding the pin and provided with a recess elongated in the direction of thrust transmitted by the piston, a pair of elongated similar roller sections disposed within the recess on opposite sides of the direction line of thrust transmitted by the piston and having their curved surfaces bearing against the wrist pin and the opposed side of the recess, said opposed side of the recess being formed to provide an arcuate track for the roller sections, and means for maintaining said roller sections in cooperative bearing relation with the wrist pin and the opposed side of the recess.

8. In a piston wrist pin bearing, a bearing housing surrounding the pin and provided with a recess elongated in the direction of thrust transmitted by the piston, a pair of elongated similar roller sections disposed within the recess on opposite sides of the direction line of thrust transmitted by the piston and having their curved surfaces bearing against the wrist pin and the opposed side of the recess, said opposed side of the recess being formed to provide an arcuate track for the roller sections, means pivotally connecting the axes of the rollers, and fixed spacer means in the opposed side of the recess for maintaining the roller sections in bearing relation with said opposed side.

9. In a piston wrist pin bearing, a bearing housing surrounding the pin and provided with a recess elongated in the direction of thrust transmitted by the piston, a pair of elongated similar flattened roller sections disposed within the recess on opposite sides of the direction line of force transmitted by the piston and having their curved surfaces bearing against the wrist pin and the opposed side of the recess, said opposed side of the recess being formed to provide an arcuate track for the roller sections concentric with the wrist pin, means pivotally connecting the rotational centers of the rollers, and spacer means in the arcuate track to maintain the sections radially inclined toward the wrist pin.

10. In a piston wrist pin bearing for an internal combustion engine, the combination of a connecting rod head having a recess and a pair of similar flattened roller bearing sections in the recess extending longitudinally of the wrist pin and arranged radially thereof, pivotal connections between the longitudinal axes of the bearing sections, an arcuate bearing seat for the sections in the outer wall of the recess, and spacer means for the bearing sections in said outer wall.

11. Apparatus as set forth in the claim 10 wherein the spacer means extends longitudinally the full length of the bearing sections, and means are provided for holding the spacer means and bearing seat in fixed relation.

12. In a wrist pin bearing wherein the major thrust is in one direction, a connecting rod pivotally connected to the wrist pin and having an elongated recess on one side thereof, means providing an arcuate roller bearing race concentric with the wrist pin in the wall of the recess remote from the wrist pin, a pair of flattened sections of roller bearings disposed within the recess and having their bearing surfaces resting against the race and the wrist pin, a triangular spacer fixedly secured in the race between the outer sides of the sections, and means to prevent the inner sides of the sections from spreading apart.

13. In a wrist pin bearing wherein the major thrust is in one direction, a connecting rod pivotally connected to the wrist pin and having an elongated recess on one side thereof, means providing an arcuate roller bearing race concentric with the wrist pin in the wall of the recess remote from the wrist pin, a pair of flattened sections of roller bearings disposed within the recess and having their bearing surfaces resting against the race and the wrist pin, a triangular spacer fixedly secured in the race between the outer sides of the sections, and links connecting the rotational axes of the sections.

In testimony whereof, I, THOMAS ELLIOTT, affix my signature.

THOMAS ELLIOTT.